Dec. 26, 1933.  W. G. PLUMB  1,941,045
MACHINE FOR APPLYING SOLDER TO CANS
Filed Jan. 19, 1932  7 Sheets-Sheet 1

INVENTOR
Walter G. Plumb
BY
Sturtevant, Mason & Porter
ATTORNEYS

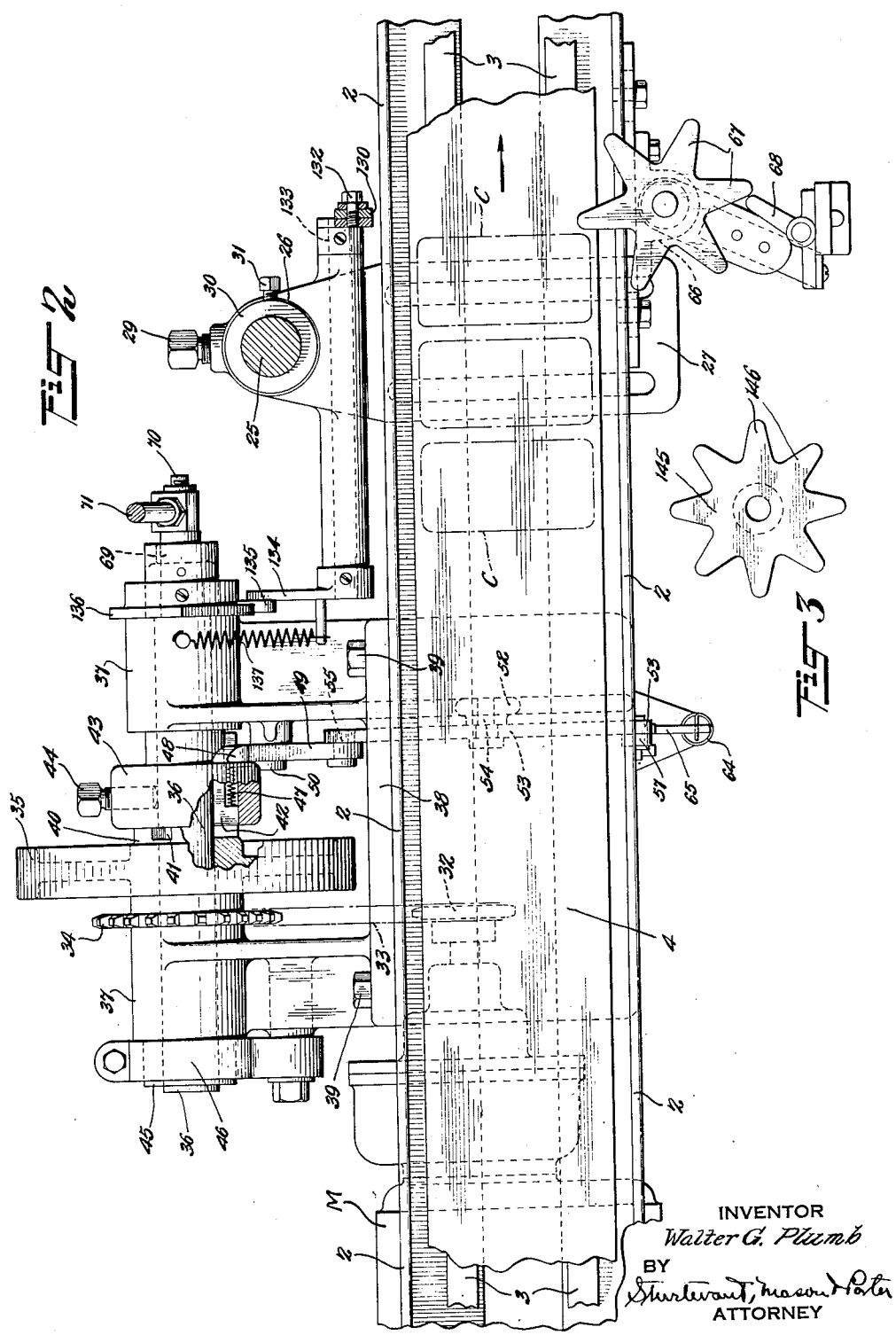

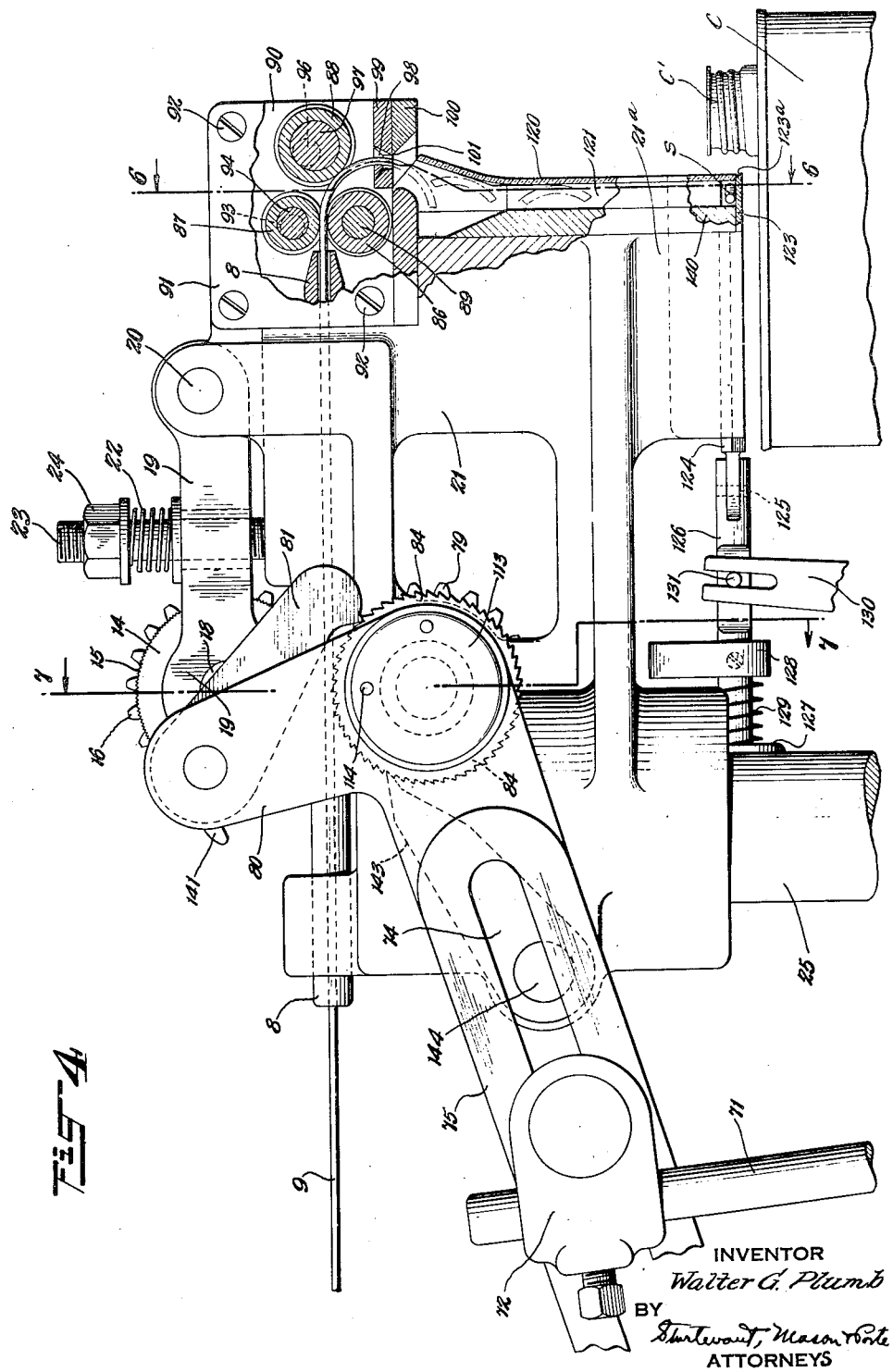

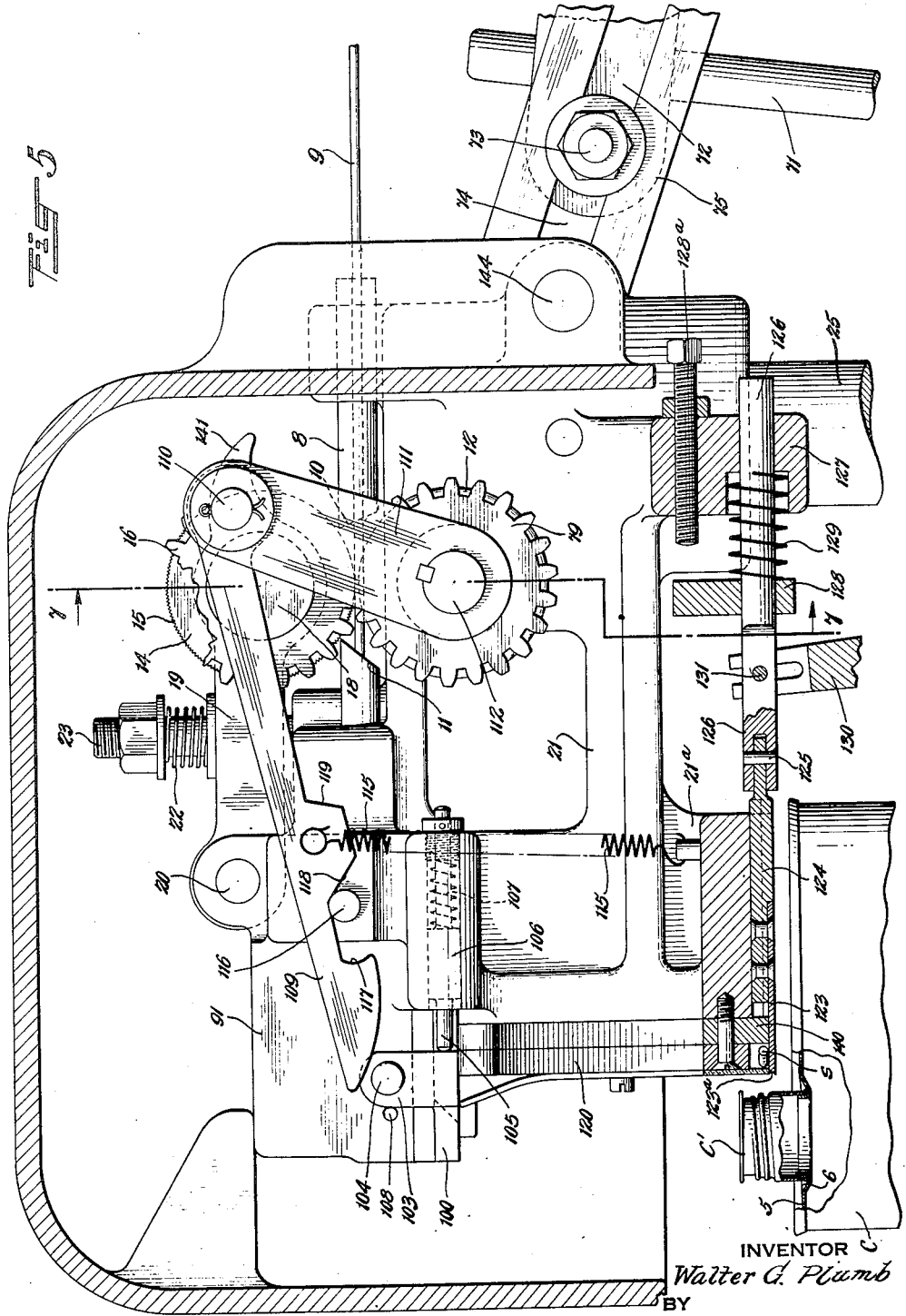

Dec. 26, 1933.  W. G. PLUMB  1,941,045
MACHINE FOR APPLYING SOLDER TO CANS
Filed Jan. 19, 1932    7 Sheets-Sheet 5
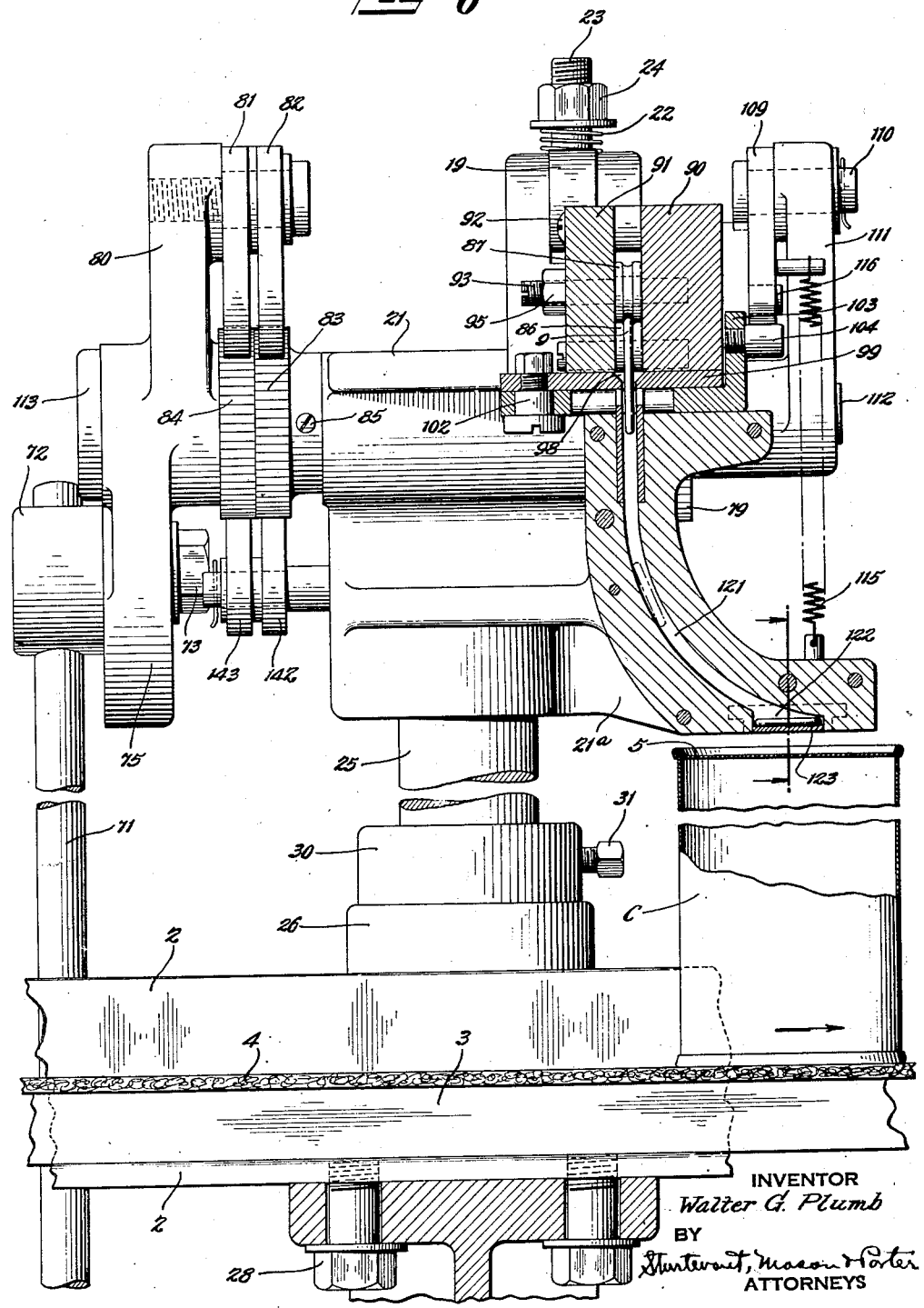
INVENTOR
Walter G. Plumb
BY
ATTORNEYS Dec. 26, 1933.  W. G. PLUMB  1,941,045
MACHINE FOR APPLYING SOLDER TO CANS
Filed Jan. 19, 1932  7 Sheets-Sheet 6
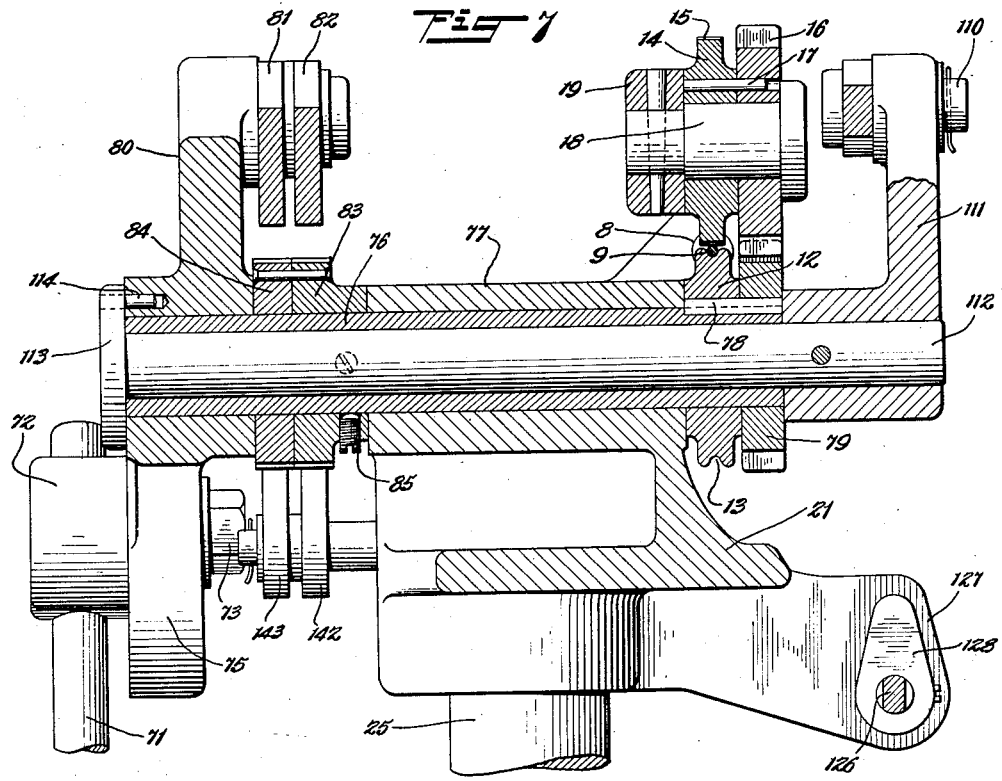
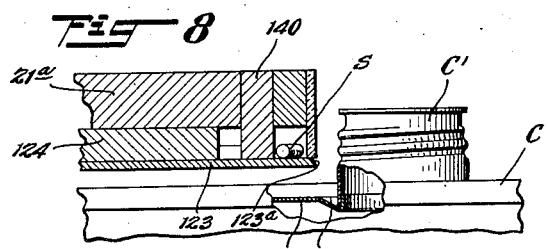
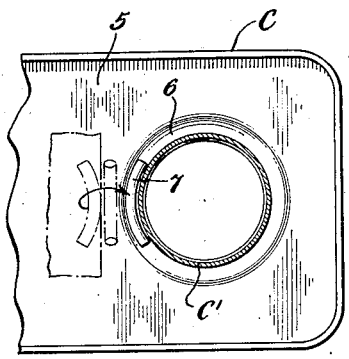
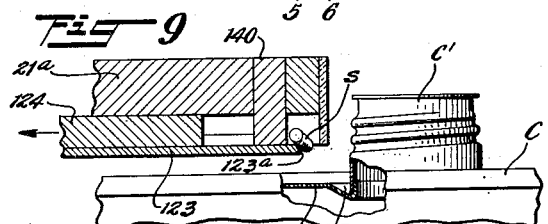
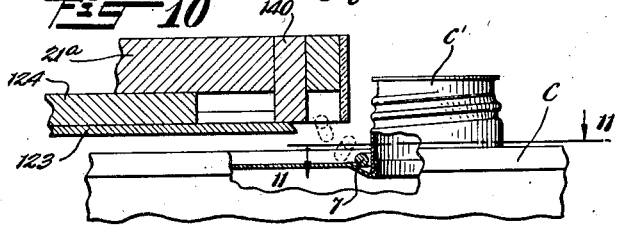
INVENTOR
Walter G. Plumb
BY
Sturtevant, Mason & Porter
ATTORNEYS

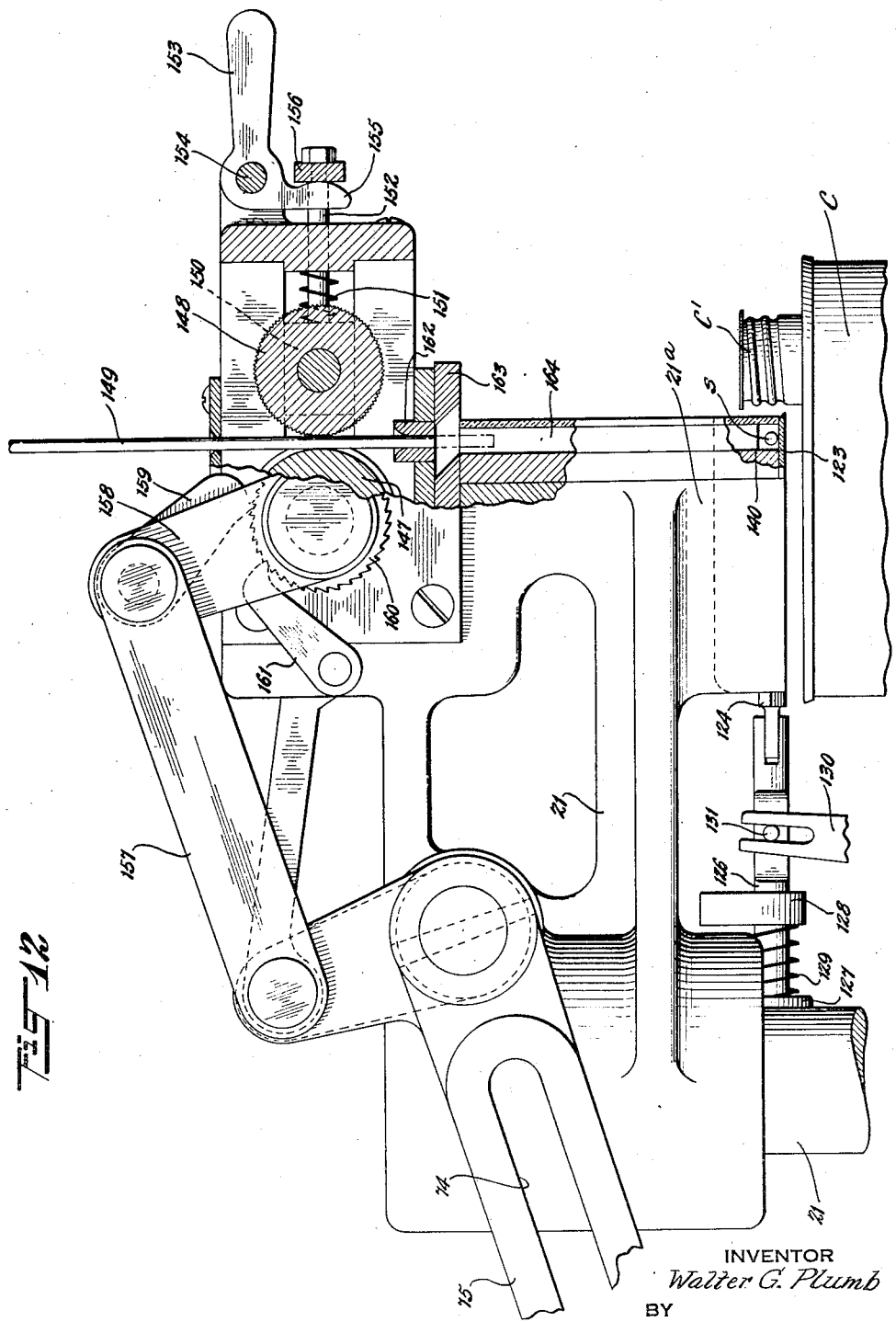

Patented Dec. 26, 1933

1,941,045

UNITED STATES PATENT OFFICE 1,941,045

MACHINE FOR APPLYING SOLDER TO CANS

Walter G. Plumb, Glen Rock, N. J., assignor to Continental Can Company, Inc., New York, N. Y., a corporation of New York Application January 19, 1932. Serial No. 587,581

7 Claims. (Cl. 113—94)

The invention relates to new and useful improvements in a machine for applying solder to cans, and more particularly to a means for supplying a measured amount of solder in sufficient quantity to form a solder bond between parts of a can body.

An object of the invention is to provide a solder applying means wherein a solder wire is intermittently fed in measured lengths, the measured length cut from the solder wire and applied in a predetermined position to the can.

A further object of the invention is to provide a machine of the above type wherein the means for feeding the solder wire, cutting the solder wire and applying the same to the can, is automatically controlled by the can so that no solder will be fed, cut and released for applying, unless there is a can present to which it may be applied.

A still further object of the invention is to provide a machine of the above type with means for giving to the measured length of solder a predetermined shape conforming with the part of the can body to which it is to be applied.

These and other objects will in part be obvious and will in part be hereinafter more fully disclosed.

In the drawings which show by way of illustration one embodiment of the invention—

Fig. 2 is a view partly in plan and partly in section along the line 2—2 of Fig. 1;

Fig. 3 is a detail showing a modified form of star-wheel forming a part of the can control for the solder applying devices;

Fig. 4 is a side elevation with parts broken away and in section of the solder feeding and delivering mechanism;

Fig. 5 is a side elevation of the mechanism shown in Fig. 4, as viewed from the opposite side, with the safety cover for the operating parts in place;

Fig. 6 is a sectional view on the line 6—6 of Fig. 4;

Fig. 7 is a sectional view on the line 7—7 of Figures 4 and 5;

Figures 8, 9 and 10 are details in vertical section through the lower portion of the solder applying means and through a can placed for receiving the solder, with the control slide for releasing the solder lengths in different positions;

Fig. 11 is a view partly in section and partly in plan on the line 11—11 of Fig. 10, and showing in full lines the final position of the solder length, and in broken lines the different positions of the solder length as it moves to final position;

Fig. 12 is a view partly in side elevation and partly in section showing a slightly modified form of solder feeding mechanism where it is not desired to give any particular shaping to the solder length.

Figure 1:
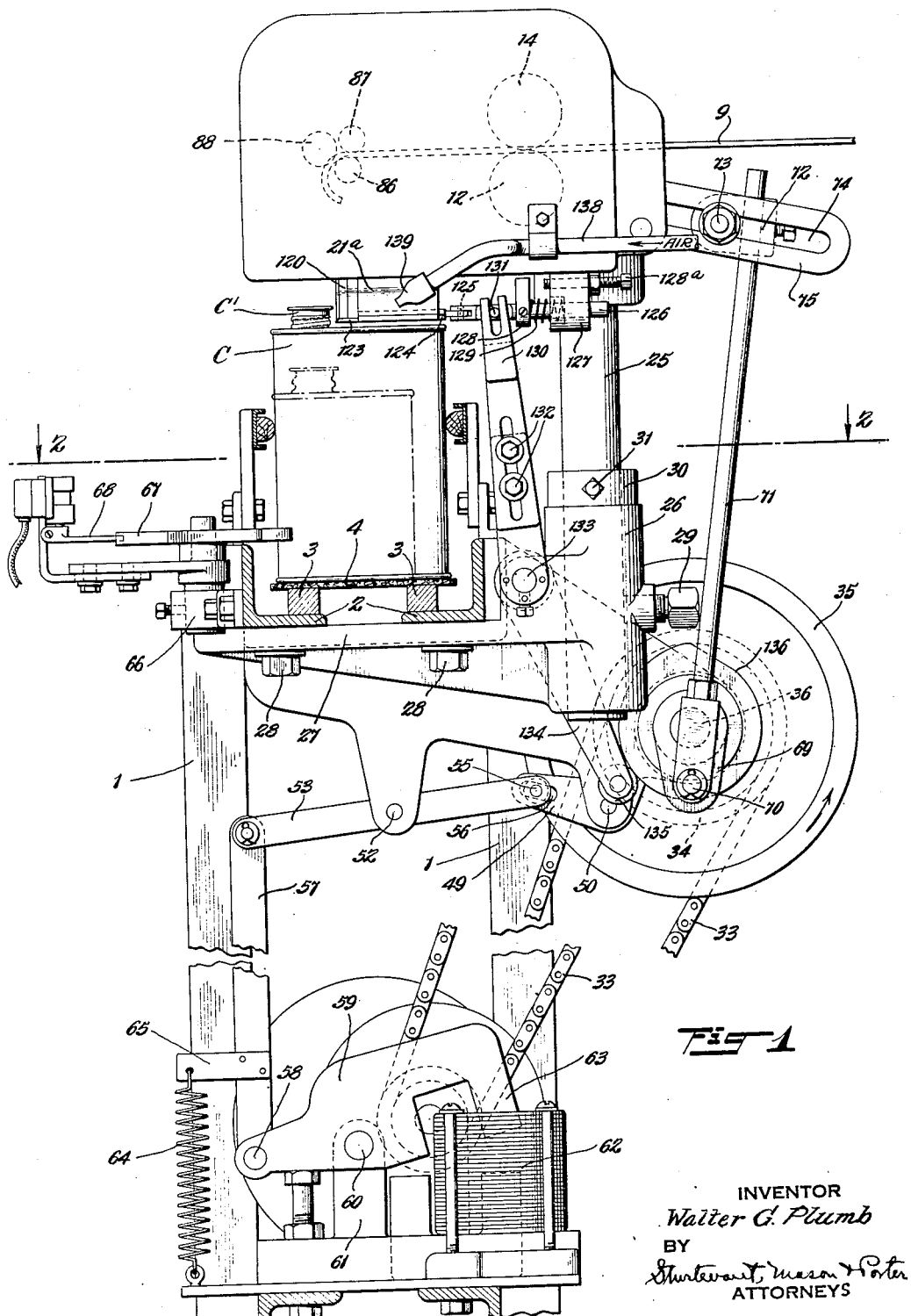
Figure 1 is a view partly in end elevation and partly in section showing a machine embodying the improvements.

The invention is directed to a machine for applying solder to cans and includes means for feeding the cans along a support therefor to a station where the solder is cut into proper lengths and applied to the parts which are to be solder bonded, after which the can is then conveyed to a station where heat is applied for melting the solder and the bonding of the parts. The feeding mechanism for the can includes a carrying belt on which the cans are supported, and rails on which the belt is mounted and slides. The belt is given a continuous movement through the solder applying station, and the solder is applied to the cans without requiring the cans to stop. Solder is fed from a supply in the form of a wire. This solder wire passes through a suitable guide tube and to feed rolls which are intermittently operated for the purpose of feeding the solder wire a measured length. Means is provided for adjusting the movement of the feed wheels so as to vary as desired this measured length. The solder wire, as it is fed forward, in the preferred form of the invention, passes through forming rolls which engages the measured length of solder and shapes it so as to conform to the shape of the can part to which it is to be applied. After the solder length has been shaped, it is severed from the wire and drops into a guide chute or magazine which is so constructed as to position a single length of solder for releasing, and in a particular position therein. The solder lengths are released one at a time from this magazine by a control slide or gate, and are released in such a way that the solder will fall by gravity and be placed in a predetermined position at a predetermined place on the can. A jet of air is utilized for insuring the placing of the solder at the proper place on the can. The solder feeding mechanism, the cutting mechanism and the applying mechanism are all operated so as to move through one cycle when set into operation, so that one length is formed and one length is released. This mechanism is automatically controlled by the passing can, so that if there is no can to which solder is to be applied present, no solder length will be measured or released for applying to the can.

Referring more in detail to the drawings, the machine embodying the improvements includes a supporting frame having vertical standards 1, 1 carrying angle bars 2, 2 which are provided with guide rails 3, 3, and on these guide rails 3, 3 rests and moves the conveying belt 4. The means for moving the conveying belt has not been shown, and may be of any suitable character. The cans to which the solder is to be applied are indicated at C in the drawings. The can illustrated is usually referred to as a square can, as the side walls of the body are parallel. The can is provided with a nozzle C', and the invention is shown as applying solder for the purpose of bonding the nozzle to the can. As shown in Figures 8 to 11, the upper end 5 of the can C is provided with an opening around which is formed a flange and a depression indicated at 6. The nozzle C' slips down over the flange, and in order to bond the nozzle to the end of the can, it is desired to fill the depression 6 with solder. As shown in Fig. 11, a solder length 7 has been formed and is placed in this depression. This solder length is curved to conform to the shaping of the nozzle and is laid in the depression where it remains while the can is conveyed to a station where suitable means is provided for applying heat to the solder and distributing the same so as to firmly bond the nozzle to the can end throughout the entire circumferential area of the nozzle. The solder length is so proportioned as to give just the right amount of solder for producing this bond without any excess of solder, which would lead to a wasting of the solder and unsightly bonds.

The invention has to do particularly with a mechanism which forms and applies to the cans these solder lengths of the desired shape and length. The solder is fed from a suitable supply source in the form of a wire into a tube 8. The solder wire is indicated at 9. The tube 8 is in two lengths. The receiving length terminates at 10, while the delivering length of the tube begins at 11, thus forming a space between the ends of the tube where the solder feeding rolls make contact with the solder wire for gripping and feeding the same. The solder feeding rolls are illustrated in Figures 4, 5 and 7. There are two rolls. The lower roll 12 is provided with a peripheral groove 13 receiving and guiding the solder wire 9, and the upper feed roll 14 which is provided with a knurled face 15 which bears on the upper side of the solder wire. The upper roll 14 is attached to a gear 16 by pins 17, and the feed roll and gear are journaled in a supporting headed stud 18 fixed to an arm 19 pivoted at 20 to the frame 21 or supporting head of the machine. A spring 22 encircling a rod 23 bears against the upper face of the arm 19, and a nut 24 is threaded on to the rod for adjustment so as to vary the tension on the spring 22. This spring bearing on the arm 19 will yieldingly force the upper feed roll 14 into gripping contact with the solder wire and causing the solder wire to be firmly gripped between the two rolls 12 and 14, so that when these rolls are turned a predetermined angular extent, a predetermined or measured amount of solder wire will be fed through the tube.

The frame or supporting head 21 is carried by a standard 25 which is mounted in a sleeve 26 carried by a bracket 27 which is bolted to the angle bars 2, 2 by suitable bolts 28, 28. The standard 25 is held in the sleeve 26 by means of a set screw 29, and a collar 30 secured to the standard by a set screw 31. This collar engages the upper end of the sleeve. The collar and the set screw 29 serve as a means whereby the standard may be raised and lowered for different size cans. When it is raised, the entire supporting head carrying the solder feeding rolls will be raised and lowered. In Fig. 1 of the drawings, a smaller can is shown in broken lines indicating the height of the can, and this adjustment is for the purpose of setting the parts to cooperate with cans of varying heights.

The solder feed rolls are driven intermittently, and are set into operation by a passing can so as to feed a solder length when cans are being fed into position to receive the measured cut lengths of solder. The solder rolls are actuated from a motor M (see Fig. 2) carrying a sprocket wheel 32 over which a sprocket chain 33 runs, and this sprocket chain engages a sprocket wheel 34 which is attached to the hub of a fly wheel 35. The fly wheel 35 is mounted for free rotation on a shaft 36 which in turn is mounted in bearings 37, 37 carried by the bracket 38 which is secured by bolts 39 to one of the angle bars 2. The fly wheel 35 is provided with a clutch hub 40 having sockets 41 adapted to receive a clutch dog 42 carried by a collar 43 fixed to the shaft 36 by a set screw 44. When the dog is in one of the sockets, then the shaft 36 will be turned with the fly wheel. When the dog is retracted, then the fly wheel will turn freely on the shaft 36, which may stop. The purpose of this clutching mechanism is to give an intermittent rotation to the shaft 36. On the end of the shaft 36 is a collar 45 with which a brake shoe 46 cooperates. This brake shoe puts sufficient drag on the shaft so that when it is released from the fly wheel, it will stop immediately.

The clutch dog is yieldingly pressed toward the fly wheel by a spring 47 and is held retracted by a control cam 48 which is of the usual construction. Said dog projects beyond the face of the collar and is provided with an over-hanging end which engages the cam 48 when said cam is swung radially of the shaft 36 to bring it into the path of movement of the end of the dog. When, however, this cam is swung outwardly away from the shaft, it will release the dog, and then the spring will move the dog into one of the sockets 41, thus coupling the collar 43 to the fly wheel 35 and causing the shaft 36 to rotate. The cam is moved so as to release the dog, and is then moved back into position to automatically retract the dog, so that when the shaft 36 is coupled to the fly wheel 35, it will turn through one rotation and then stop.

The control cam 48 for the clutch dog is carried by a rock lever 49 (see Fig. 1). This rock lever 49 is pivoted at 50 to a depending lug carried by the bracket 52 which is attached to the angle bars 2. A lever 53 is pivoted at 54 to another depending lug on this bracket, and this lever 53 carries a pin 55 engaging a slot 56 in the rock lever. When the lever 53 is oscillated, the rock lever will be shifted. Attached to the lever 53 is a link 57 which is pivoted at 58 to a lever 59. This lever 59 is pivoted at 60 to a lug 61 carried by a bracket or base plate which supports a solenoid 62. On the end of the lever 59 is a core 63 which extends into the solenoid. When the solenoid is energized, it will cause the lever 59 to turn in a clockwise direction (Fig. 1), thus raising the link 57, oscillating the lever 53 and turning the rock lever 49 in a counter-clockwise direction. This withdraws the cam from the path of the tail of the clutch dog and connects the shaft 36 to the fly wheel 35 for imparting thereby a single rotation. When the solenoid 62 is deenergized, the spring 64 engaging at one end the lug 65 on the link 57, and at its other end the bar attached to the frame of the machine, turns the lever 59 in a counter-clockwise direction, and this will turn the rock lever 49 in a clockwise direction and position the cam so as to engage the tail end of the clutch dog and release the shaft 36 from its connection to the fly wheel.

Mounted on one of the angle bars 2 is a bracket 66 carrying a short shaft, at the upper end of which is mounted a star wheel 67. This star wheel projects into the path of travel of the cans, so that when a can is properly placed preparatory to receiving a solder length, it will engage one arm of the star wheel and impart an angular movement thereto. The next can passing engages the next arm of the star wheel and likewise imparts an angular movement thereto. For each angular movement of the star wheel 67, another arm thereof engages an arm 68 of a suitable electric switch, and turning the same will establish a circuit in lines leading to the solenoid 62, so that the can as it turns the star wheel will energize the solenoid, and cause this shaft 36 to be given a single rotation, after which it stops. The next can will again energize the solenoid 62 and impart another rotation to the shaft 36. On the end of the shaft 36 is a projecting arm 69 carrying a crank 70 with which a link 71 is connected. This link at its upper end carries an adjustable collar 72 which is connected to a stud 73 adjustable in a slot 74 in a lever arm 75. The lever arm 75 is freely journaled on the sleeve shaft 76 mounted in a bearing bracket 77. This bracket 77 is carried by the head 21. The solder feed roll 12 is keyed to this sleeve shaft 76 by means of a key 78. Alongside of the solder feed roll 12 is a gear 79 which meshes with the gear 16 and this is likewise keyed to the shaft so that the solder roll 12 and gear 79 will turn with the shaft 76 and this imparts positive rotations through the gear 16 to the solder feed roll 14. The arm 75 is attached to a sleeve which is freely journaled on the shaft 76, and this sleeve carries an arm 80 provided with two pawls 81 and 82. Fixed to the sleeve shaft 76 is a ratchet 83 with which the pawl 82 engages. Fixed to the ratchet 83 is a second ratchet 84 with which the pawl 81 engages. The ratchet 83 is secured to the sleeve shaft by a set screw 85. As the shaft 36 is rotated, it will turn the crank 69 through one complete rotation, and this will raise and lower the link 71 and impart an oscillation to the arm 75 which in turn oscillates the arm 80, and this will move the pawls back and forth so as to turn the sleeve shaft 76 through a desired angular movement. The turning of the sleeve shaft 76 causes the solder feed rolls to move the solder wire a distance determined by the angular movement of the sleeve shaft 76. By adjusting the stud 73 in the slot 74 outward away from the sleeve shaft 76, the extent of movement imparted to the pawls will be increased and a greater length of solder wire fed by the rolls. On the other hand, when this stud is moved toward the center of the sleeve shaft 76, a shorter length will be fed. This provides a simple means whereby a predetermined or measured length of solder wire is fed for each can. After the parts are set, then the same measured length of solder wire will be fed as each can engages the star wheel and brings about a release of the clutch dog, so that the shaft 36 will have one rotation imparted thereto. This enables the feed of the solder wire to be varied, although the shaft 36 always is given a complete rotation and is operated at a uniform speed.

It is often desired to shape the solder length so as to conform to the part of the can to which the solder is to be applied. In the present embodiment of the invention, where solder is applied to the bonding of a cylindrical nozzle to the can end, it is desired to curve the solder length to conform to the curvature of the nozzle, so that the solder length will lie close to the can nozzle throughout the extent of the solder length, and when said solder is melted for bonding, it will then cause the solder to flow and contact with the metal in the region where it is desired to produce the solder bond. In order to curve the solder length, it is given the desired form or shape before the length is cut from the solder wire. As the solder wire 9 passes from the delivery end of the guide tube 8, it is led between two rolls 86 and 87. These rolls are provided with grooves in their outer faces which guide and direct the solder wire. The solder wire engaging the rolls will cause the same to rotate. Associated with these rolls 86 and 87 is a third roll 88, likewise provided with a circumferential groove conforming to the shape of the solder wire for guiding and directing the same. This roll 88 is so positioned relative to the rolls 86 and 87, that the end of the solder wire after passing through the rolls 86 and 87 will be curved downwardly and given a shape conforming to the shape of the nozzle. The roll 86 is carried by a supporting stud 89 which is mounted in plates 90 and 91 attached to the head or frame 21. These plates are spaced from each other to provide a space for the rolls and for the solder wire. They are secured together by suitable bolts 92, 92. The stud 89 carrying the roll 86 is mounted in these plates. It extends through the plates 92 and into a recess in the plate 90. The roll 87 is carried by a stud 93 (see Fig. 6), having an eccentric portion 94 on which the roll freely journals. The outer end of the stud 93 is provided with a slot for a screw driver, and also with a locking nut 95. By releasing the nut 95, the stud can be turned so as to shift the rotating position of the roll 87 toward or from the roll 86. This is for the purpose of accommodating solder wires of different sizes, and also for insuring the proper setting of the rolls for guiding and directing the solder wire. The roll 88 is likewise carried by a stud 96 which has an eccentric portion 97, and by shifting this eccentric portion, the rotating position of the roll 88 may be shifted toward and from the two rolls 86 and 87. This enables the curvature given to the end of the solder wire to be varied so that it will conform to the curvature of the part to which the solder is to be applied.

The solder wire after passing the roll 88 is directed through a guiding opening 98 in a stationary shear cutter 99. This stationary shear cutter 99 extends beneath the plates 90 and 91 and is suitably secured to the head 21. Beneath the stationary shear cutter 99 is a movable plate 100 which carries a movable cutting blade 101. This movable plate 100 is mounted on a pivot bolt 102 attached to the stationary shear cutter plate 99. The movable plate 100 has an angle portion 103 carrying a pin 104. A plunger 105 is mounted in a bearing sleeve 106 carried by the head 21. A spring 107 in the bearing sleeve pressing against the shoulder on the pin, normally forces the plunger to the right as viewed in Fig. 5. This plunger bears against the side face of the upturned portion 103 and normally moves the plate 100 carrying the movable cutter 101 to its retracted position, as shown in Fig. 4. There is a stop pin 108 on the plate 91 which limits the swinging movement of the plate 100 carrying the movable cutter. The cutter is moved in the opposite direction for severing the solder wire by means of a bar 109. This bar 109 is pivoted at 110 to an arm 111 fixed to a shaft 112. This shaft 112 extends centrally through the sleeve shaft 76 (see Fig. 7). On the left-hand end of the shaft 112 is a cap plate 113. Pins 114 join this cap plate to the sleeve carrying the arm 75. When this arm 75 is oscillated, it not only, through the pawls 81 and 82 imparts an intermittent rotation to the sleeve shaft 76, the extent of which can be varied, but it also imparts a fixed oscillation to the shaft 112. The bar 109 is given an endwise reciprocation by the oscillations imparted to this arm 111. The bar is yieldingly moved downward by a spring 115 and rests on a pin 116 carried by the head 21. The bar 109 has a hook-shaped end 117. It also has a cam face 118 and a cam face 119. When said bar is moved endwise to the left, as viewed in Fig. 5, the cam face 118 riding on the pin 116 will raise the hooked end carrying it over the pin 104, and after the cam face 119 passes this pin 116, then the lower end of the bar will be lowered so that the retracting movement of the bar due to the oscillation of the arm in the opposite direction will cause this hooked end to engage the pin 104 and move the cutter forward severing the solder wire. The movement of the cutter required to cut the solder wire is comparatively short. During this movement, the spring 107 is compressed as the plunger 105 is retracted. On the retracting movement of the bar 109 the cam face 119 engaging the pin 116 will disconnect the bar from the pin 104 and allow the cutter to be returned to idle position through the action of the spring 107. This provides a means whereby the cutter will be quickly given a movement for severing the wire after the proper measured length thereof has been shaped, and while the sleeve shaft 76 is on its idle movement, so that there is no feed movement being imparted to the solder wire. The lengths of solder wire as they are severed fall into a guide chute or magazine 120 (see Figures 4 and 6). The magazine has a funnel-shaped end into which the solder lengths drop, and the solder lengths pass downward into a guideway 121 which is shaped so that the solder lengths will all be positioned in the same manner. The guideway 121 is curved from a vertical position where the solder length is received, to a substantially horizontal position indicated at 122 where the solder length is laid on to a supporting plate 123. The time of discharge of the solder length is determined by the movements of the supporting plate 123 for the solder length at the lower end of the magazine or guide chute which receives these solder lengths. This supporting plate 123 is mounted in the portion 21ª of a head 21 and is adapted to be retracted to release the solder length in proper timing with the movements of the cans beneath the head. The supporting plate or gate 123 is attached to the bar 124 which is mounted for reciprocation in a suitable supporting guideway in the part 21ª. Said bar is connected by a pin 125 to a rod 126 which reciprocates in a lug 127 carried by the head 21. Attached to this rod 126 is a collar 128. A spring 129 bears against the collar and is seated in a recess in the lug 127. This spring normally forces the supporting plate 123 to closed position. There is a bolt 128ª which may be used in the initial setting of the slot. This bolt contacts with the collar 128 and determines the retracted position of the supporting plate. The supporting plate is moved for releasing the solder length by an arm 130 having a forked upper end adapted to engage a pin 131 on the rod 126. This arm 130 is made in two sections which are secured together by bolts 132. This provides for lengthening or shortening the arm when the head is raised or lowered for different size cans. The arm is fixed to a shaft 133. The shaft 133 also carries an arm 134 provided with a roller 135 bearing on the face cam 136 attached to the shaft 36. When the shaft 36 is given one rotation, it will rotate the control cam 136 which, operating on the arm 134, will oscillate the arm 130 and retract the supporting plate so as to release a solder length.

A spring 137 is attached to the arm 134 at one end and to the head 21, and serves to hold the roller 135 in contact with the control cam 136. This control cam is so shaped that it quickly releases the solder length and then releases the supporting plate so that it will be returned to its closed position.

When a can passes the star wheel, it will set into operation the solder feeding and cutting mechanism. It also causes the slide to be opened and closed. The solder wire is fed forward, shaped and cut, and drops into the magazine. The broken line positions in Fig. 1 show the movement of the solder length through the magazine. The slide is returned to closed position before the solder length reaches the slide, so that the solder length cut and placed on the slide by the can passing the star wheel, will be retained thereon until the next can trips the star wheel and releases the slide. The star wheel is so positioned that the first can to trip it will be at the solder receiving station ready to receive the solder length which has been previously formed, cut and placed on the slide.

Referring in particular to Figures 8 to 11, it will be noted that in Fig. 8, the supporting plate 123 is in closed position, supporting the solder length s. As it lies on the supporting plate, it curves in the opposite direction of the curvature of the nozzle C'. The supporting plate at its delivery end is tapered as indicated at 123ª. As the supporting plate is moved to the position shown in Fig. 9, the central portion of the solder length will be first released, thus causing the solder length to start on a semi-rotation. As the solder length drops, it will continue in its semi-rotation and be positioned against the nozzle as it falls by gravity with the inner curved face of the solder length against the outer curved face of the nozzle. In order to insure the proper placing of the solder length in contact with the nozzle, an air jet has been provided. In Fig. 1 of the drawings, there is shown an air pipe 138 provided with a discharge jet 139, and the jet of air is directed against the nozzle and against the solder length as it falls, so that if it does not, by gravity, place itself in the depression 6, and properly against the nozzle, this air jet will force it along until it is properly positioned. In order to facilitate the turning of the solder length when the supporting plate 123 is retracted, there is a stop 140 which forces the solder length off from the supporting plate, aiding in the releasing of the solder so that it will take a half-turn and be properly positioned against the nozzle.

In order to aid in the threading of the wire through the tube and between the solder rolls, the arm 19 is extended and provided with a finger piece 141 which may be grasped for lifting the arm against the tension of the spring 22. When the head 21 is raised or lowered for different heights of cans, the arm 130 is adjusted as to length and the sleeve 72 is shifted endwise on the link 71. These are all the adjustments of the operating mechanism necessary for cans of different heights. Associated with the guide rails 3 on which the conveyor belt 4 travels are side guide rails 2ᵃ for guiding the can in a fixed path of travel beneath the head 21 so as to insure that each nozzle will pass the end of the supporting plate 123 at substantially the same distance therefrom. In order to prevent the sleeve shaft 76 from retrograde movement on the idle strokes of the feed pawls, holding pawls 142 and 143 are provided which cooperate, respectively, with the ratchets 83 and 84. These pawls are mounted on a supporting pivot pin 144 (see Fig. 4).

From the above it will be apparent that a solder applying means has been provided wherein a solder wire is intermittently fed by feeding rolls in order to supply a measured amount of solder. The end of the solder wire is passed through forming rolls which shapes the end of the solder wire so that it conforms to the shaping of the can part to which the solder length is to be applied. The solder length is then cut to the measured length desired, and is passed into the delivery chute or magazine, where it is supported on a plate operated in timing with the conveyor so as to release the solder length and permit it to drop on to the end of the can in a proper predetermined position thereon. To aid in the positioning of the solder length in its proper place, a jet of air contacts with the solder length, forcing it toward the nozzle. The solder feeding, cutting and applying devices are given one cycle of operation and then stopped. This cycle of operation is controlled by the passing can which causes the circuit to be closed that energizes the solenoid controlling the position of the cam associated with the clutch dog so that at the proper time the feeding mechanism will be started on its cycle of operation, thus producing a formed solder length which is released so as to be placed on the can in proper position relative to the nozzle as it passes beneath the solder length applying head.

The machine may be readily adjusted for cans of different heights simply by raising and lowering the head supporting the solder feed forming devices and the supply magazine. Certain arms and links have to be adjusted as to length, but the timing of the parts is not disturbed when the head supporting all of these operating parts is raised or lowered. In Fig. 3 of the drawings, the star wheel 145 is shown having eight arms 146, while the star wheel 67 is only provided with six arms. This star wheel shown in Fig. 3, is used when can bodies of a smaller size are being fed to the solder applying mechanism. The solder applying mechanism is controlled in its operation by the cans themselves, and without any particular timing or positioning of the can on the conveyor belt. With smaller can bodies, the distance from center to center will be less, and the smaller star wheel is essential in order not to require any excessive spacing between the cans.

In Fig. 12 of the drawings, there is shown a slightly modified form of solder applying mechanism. Sometimes the amount of solder needed to form the bond is comparatively small, and therefore, it is not necessary to shape the solder length to conform to the surface of the part to which solder is to be applied. In such cases, the shaping rolls are omitted. The head 21 is provided with solder feed rolls 147 and 148. The solder feeding roll 147 is provided with a grooved peripheral face for receiving the solder wire which is indicated at 149. The solder feeding roll 148 is provided with a serrated face for gripping the solder roll. The solder feeding roll 148 is mounted in bearing blocks 150 which are free to slide in the supporting members therefor, and springs 151 surrounding bolts 152 engage the blocks 150 and force the same yieldingly to the left as viewed in Fig. 12. This causes the roll 148 to grip the solder wire. A hand lever 153 is pivoted at 154 to the frame and carries an arm 155 extending in rear of a bar 156. When it is desired to place the solder between the rolls, the lever is turned so as to cause the bar 156 to engage the heads of the bolts 152 and thus draw the blocks 150 carrying the roll away from the solder wire. The solder feeding roll 147 is positively driven and may be geared to the solder feeding roll 148. The arm 75 is connected to a link 157 which in turn is connected to an arm 158 mounted to turn axially relative to the solder feeding roll 147. A pawl 159 engages a ratchet 160 fixed to the shaft carrying the solder feeding roll 147. A pawl 161 serves to prevent any retrograde movement of the solder feeding roll. The solder wire is fed a measured length by the oscillations of the lever 75. The solder wire passes through a sleeve 162 which is stationary and which provides a stationary shear cutting edge at its lower face. The movable cutter 163 is operated in the same manner as described in connection with the preferred form of the invention and cuts from the solder wire a solder length which drops from the conveyor chute 164 on to the supporting plate or gate 123. This supporting plate or gate is operated in the manner described above by the lever 130 and serves to release a solder length so that it will drop on to the can beneath the same.

It will be obvious that changes in the details of construction and the arrangement of the parts may be made without departing from the spirit of the invention as set forth in the appended claims.

Having thus described the invention, what I claim as new and desire to secure by Letters Patent, is—

1. A machine for applying solder to cans including feed rolls for feeding a solder wire, means for intermittently turning said rolls to feed a measured length of wire, means for curving the end of the solder wire to conform to the can part to which it is to be applied, means for cutting from the wire the measured shaped length of solder, means for receiving and retaining the curved solder length, including a movable member on which the solder rests, means for feeding cans beneath said retaining means and automatic means set into operation by a can for retracting the supporting member and releasing the cut length of solder so that it will drop onto said can in a predetermined position for soldering.

2. A machine for applying solder to cans including feed rolls for feeding a solder wire, means for intermittently turning said rolls to feed a measured length of wire, means for curving the end of the solder wire to conform to the can part to which it is to be applied, means for cutting from the wire the measured shaped length of solder, means for receiving and retaining the curved solder length including a slide on which said solder length rests, means for feeding cans beneath said retaining means, and automatic means set into operation by a can for retracting the slide and releasing the cut length of solder so that it will drop on to said can in a predetermined position for soldering.

3. A machine for applying solder to cans including means for feeding the cans, means for intermittently feeding a solder wire in measured lengths, shaping rolls through which the solder wire is forced by the solder feed for shaping the end of the solder wire to conform to the can part to which it is to be applied, means for cutting from the wire the shaped measured length, means for receiving and supporting the cut solder length including a slide on which said length rests, means for feeding cans beneath said slide and retaining means, and automatic means controlled by the passing can for retracting the slide so as to permit said solder length to drop on to the can in a predetermined position for soldering.

4. A machine for applying solder to cans including means for feeding the cans, means for intermittently feeding a solder wire in measured lengths, shaping rolls through which the solder wire is forced by the solder feed for shaping the end of the solder wire to conform to the can part to which it is to be applied, means for cutting from the wire the shaped measured length of solder, a guide chute for receiving the cut length, a supporting plate on which the solder length rests, and means for retracting said supporting plate in timing with the movements of the can whereby the solder length will be placed in a predetermined position on the can.

5. A machine for applying solder to cans including means for feeding the cans, means for intermittently feeding a solder wire in measured lengths and shaping the end of the wire to conform to the can part to which it is to be attached, means for cutting from the wire the shaped measured length of solder, means for placing the cut length of solder in a predetermined position on the can, means for operating said solder feeding, cutting and applying means including a motor, a shaft operated thereby, a clutch for connecting said shaft to the motor having a yielding dog normally connecting the parts, and means controlled by the cans for retracting and releasing said dog whereby said shaft when set in motion will be given one rotation for operating the feeding, cutting and applying means.

6. A machine for applying solder to cans including means for feeding the cans, means for intermittently feeding a solder wire in measured lengths, cutting devices for cutting from the wire the measured length of solder, a rotating crank, a reciprocating member for operating said cutting means, and a control cam for said reciprocating member operating to permit the connection of said member to the crank and for releasing said member from the crank whereby the cutting means is given a quick actuation for cutting the solder wire.

7. A machine for applying solder to cans including means for feeding the cans, feed rolls for feeding a solder wire, means for intermittently turning said rolls to feed a measured length of wire, means for shaping the end of the solder wire to conform to the can part to which it is to be applied, means for cutting from the wire the formed measured shaped length of solder, means for placing the cut length of solder in a predetermined position on the can part, a star wheel located in the path of travel of the cans, an electric switch operated thereby, a solenoid energized when the switch is closed, and means controlled by the solenoid for automatically setting into operation the feeding, shaping, cutting and applying means.

WALTER G. PLUMB.